United States Patent [19]

Nishiyama

[11] 4,078,092
[45] Mar. 7, 1978

[54] APPLE JUICE COMPOSITIONS AND MILK-APPLE JUICE DRINK CONTAINING SUCH COMPOSITIONS

[76] Inventor: Kazuhiro Nishiyama, 14-7, Kamikotoen-1, Nishinomiya, Hyogo, Japan

[21] Appl. No.: 717,140

[22] Filed: Aug. 24, 1976

Related U.S. Application Data

[63] Continuation-in-part of Ser. No. 645,528, Dec. 30, 1975, abandoned, which is a continuation-in-part of Ser. No. 508,535, Sep. 23, 1974, abandoned, and Ser. No. 326,110, Jan. 23, 1973, abandoned.

[51] Int. Cl.$^2$ ............................................. A23L 2/02
[52] U.S. Cl. ................................... 426/584; 426/599; 426/590
[58] Field of Search ..................... 426/330.3, 584, 599, 426/590, 591

[56] References Cited

U.S. PATENT DOCUMENTS

| | | | |
|---|---|---|---|
| 2,919,195 | 12/1959 | Block | 426/599 X |
| 3,114,641 | 12/1963 | Sperti et al. | 426/599 |
| 3,647,476 | 3/1972 | Swisher | 426/584 |
| 3,692,532 | 9/1972 | Shenkenberg et al. | 426/584 |
| 3,764,710 | 10/1973 | Inagami et al. | 426/591 |

OTHER PUBLICATIONS

Grant, J. "Hackh's Chemical Dictionary", McGraw Hill Book Co., N. Y. 1969, p. 657.

*Primary Examiner*—Raymond N. Jones
*Assistant Examiner*—R. A. Yoncoskie
*Attorney, Agent, or Firm*—Frank M. Nolan

[57] ABSTRACT

Apple juice compositions are utilized to produce a stable, uncoagulated milk-apple juice drink, comprising milk, apple juice, sodium carboxymethyl cellulose, an aliphatic hydroxycarboxylic acid such as citric acid or lactic acid, with or without a coloring agent, fruit essence, seasonings and/or water.

3 Claims, No Drawings

APPLE JUICE COMPOSITIONS AND MILK-APPLE JUICE DRINK CONTAINING SUCH COMPOSITIONS

This application is a continuation-in-part of the copending application Ser. No. 645,528, filed Dec. 30, 1975, which in turn is a continuation-in-part of application Ser. No. 508,535, filed Sept. 23, 1974 and Ser. No. 326,110, filed Jan. 23, 1973, all applications now abandoned.

This invention relates to apple juice compositions which when mixed with milk produce a stable, uncoagulated milk-apple juice drink.

The primary components of the apple juice compositions of this invention comprise apple juice, sodium carboxymethyl cellulose and an aliphatic hydroxycarboxylic acid. The aliphatic hydroxycarboxylic acids utilized are citric, malic, lactic or tartaric acid, preferably citric or lactic acid. The apple juice compositions may also contain other components such as seasonings, coloring agents, fruit essence and/or water. Apple juice obtained from apples or apple juice in concentrated form may be employed. For example, a concentrate consisting of ⅓ or 1/5 the volume of apple juice may be used. Preservatives may be added, but are not required. The apple juice compositions, if kept in a cool place, will remain stable for a long time.

To obtain an apple juice composition which can be added to milk to produce a stable, uncoagulated drink, the apple juice, sodium carboxymethyl cellulose and aliphatic hydroxycarboxylic acid must be within critical narrow quantitative ranges. The amount of sodium carboxymethyl cellulose must be 4.2–6.0 g per 100 ml of apple juice composition. The amount of apple juice must be 10–50 g per 100 ml of apple juice composition. The amount of aliphatic hydroxycarboxylic acid must be 3.1–5.0 g per 100 ml of apple juice composition.

The apple juice composition may be prepared by initially dissolving the required amount, within the specified range, of sodium carboxymethyl cellulose in sterilized water, well stirred and warmed, for example, to a temperature of 75°–80° C. When a large part of the sodium carboxymethyl cellulose is dissolved, an amount of apple juice within the specified range is added. After complete dissolution and cooling, one or more of the aliphatic hydroxycarboxylic acids, preferably in solution, in a total amount falling within the specified range, are gradually added with vigorous stirring to the solution of sodium carboxymethyl cellulose previously prepared. The mixture is warmed to about 75°–80° C. To the resulting solution are added any other desired optional components such as coloring agents, seasonings or fruit essences. Suitable seasonings include α-amino acids such as sodium glutamate, 1-alanine, glycin, 5'-ribonucleotide, inosinic acid or sodium succinate. Any coloring agent allowed for for use in food may be added. Fruit essences such as apple, orange, peach, strawberry, lemon, grape, pineapple or banana essence may be added to the composition.

The apple juice composition so prepared can be used in a stable solution with milk to achieve a milk-apple juice drink, not subject to coagulation. The milk-apple juice drink of this invention comprises milk, syrup and the apple juice composition. The pH of the milk-apple juice drink must have a critical, relatively narrow range and the volume ratio of milk, syrup and apple juice composition must be maintained within a critical volume ratio. The pH range of the milk-apple juice drink must be 3.6–4.5. The volume ratio of milk, syrup and apple juice composition must be 3.0–5.0:6.5–4.5:0.5. Syrup may be prepared from sterilized water and sugar or artificial sweetening materials by conventional methods. The milk is first mixed with the syrup and the apple juice composition is then added. If water is added to adjust the total volume, the added water is to be taken into account as the volume of the syrup. Preferably, fresh cows' milk is employed but other types, such as reconstituted milk may be used.

The sodium carboxymethyl cellulose used in this experiment and desirably used in the apple juice composition and milk-apple juice drinks of this invention has the property of 7.2% of water content, pH 6.8, 40 CPS, 250 mm in transparency, 0.792 of etherified degree.

The following examples illustrate the apple juice composition, the milk-apple juice drink of this invention and also the process thereof. The invention is not limited to the illustrated embodiments which are susceptible to many variations within the scope of the appended claims.

EXAMPLE I

To 70 liters of water sterilized at 80° C was added uder vigorous stirring 4.4 kg of sodium carboxymethyl cellulose (7.0% of water content, pH 6.8, 40 CPS, 250 mm in transparency, 0.792 of etherified degree) and after starting dispersion and dissolution, 30.5 kg of apple juice were added, keeping the temperature at 75°–80° C. The stirring and maintenance of the temperature were continued to dissolve the sodium carboxymethyl cellulose in water completely. Then the mixture was cooled as quickly as possible and allowed to stand over one night in a cool place. To this mixture was added under vigorous stirring a solution of 4.6 kg of citric acid in 2 liters of water, and then 110 g of sodium glutamate. The mixture was heated at 85° C and stirred for 30 minutes. To the mixture was added 12.1 g of sunset yellow FCF and 24.2 g of new coccine and 2.86 kg of strawberry essence at 75° C. The solution was brought to 100 liters by the addition of sterilized water. The solution was homogenized and filtered.

EXAMPLE II

In a manner similar to the procedures of Example I there were obtained other apple fruit juice compositions using the following components:

|  | I | II | III |
|---|---|---|---|
|  | (g) | (g) | (g) |
| Sodium carboxymethyl cellulose | 4,700 | 4,400 | 4,400 |
| Apple juice | 40,500 | 40,500 | 20,250 |
| Orange juice |  |  | 20,250 |
| Sodium glutamate | 110 |  |  |
| 5' Ribonucleotide | 5.56 |  | 11.12 |
| Tartrazine | 24 | 35.8 | 7.9 |
| Sunset Yellow FCF | 25.3 | 1,100 | 60.5 |
| Citric acid | 4,400 | 4,730 | 4,560 |
| Malic acid | 330 |  |  |
| Apple essence | 1,210 | 1,210 |  |
| Orange essence |  |  | 1,100 |

The total volume of each composition is 100 liters and the remainder of the above components is water.

EXAMPLE III 200 g of sugar was dissolved in 400 ml of water and sterilized at 80° C and cooled to 15° C. To this was added under stirring 540 g of fresh milk which was cooled. To this mixture was gradually added under stirring 100 g of the apple juice composition obtained in Example I. After mixing, the total volume of the milk drink was brought to 1800 ml by addition of sterilized water.

The milk drink contains the volume ratio of the milk : syrup : apple juice composition being 3 : 6.5 : 0.5.

In similar manner, the milk drink with apple juice was made by using the same components and volumes, except 720 ml of fresh milk.

To determine the differences between the fruit composition of this invention together with the milk drinks of this invention with the fruit compositions and corresponding milk drinks of those disclosed in U.S. Pat. No. 3,692,532 of Shenkenberg et. al., tests were conducted.

Each of the products was prepared by the following method which is hereinafter referred to as Method I described in Column 2, lines 29-41 of the Shenkenberg et al. patent.

(1) Dry mix sugar and CMC (sodium carboxymetnyl cellulose).

(2) Add the sugar-CMC mixture of about 18°-20° C to milk of 10° C.

(3) Add orange juice or apple juice to the milk mixture, allow to age for about 20 minutes at about 18° C and when used, add citric acid to the milk-juice mixture.

(4) Stir the milk-juice mixture by a homo-mixer, 8000 r.p.m.

Stability of each product obtained was observed as a condition of product, 15 ml of which was put into a test tube which was heated for 5 minutes on a boiling water bath (called Boiling Test).

The results of tests are as follows:

TEST 1

| Ingredients | (I) | (II) | (III) |
|---|---|---|---|
| Milk | 60 | 60 | 60 |
| | (g) | | |
| Orange juice | 35 | 20 | 10 |
| Sugar | 4.8 | 4.8 | 4.8 |
| CMC | 0.2 | 0.2 | 0.2 |
| Water | | 15 | 25 |
| pH | 4.485 | 5.05 | 5.68 |
| Boiling Test | − | + | ++ |

NOTE:
− means no coagulation
+, ++ means coagulation

TEST 2

| Ingredients | (I) | (II) | (III) | (IV) |
|---|---|---|---|---|
| Milk | 60 | 50 | 40 | 30 |
| | (g) | | | |
| Apple juice | 35 | 45 | 55 | 65 |
| Sugar | 4.8 | 4.8 | 4.8 | 4.8 |
| CMC | 0.2 | 0.2 | 0.2 | 0.2 |
| pH | 5.79 | 5.34 | 5.04 | 4.79 |
| Boiling Test | ++ | ++ | + | − |

TEST 3

| Ingredients | (I) | (II) | (III) | (IV) |
|---|---|---|---|---|
| Milk | 60 | 60 | 60 | 60 |
| | (g) | | | |
| Apple juice | 35 | 35 | 35 | 35 |
| Sugar | 4.8 | 4.8 | 4.8 | 4.8 |
| CMC | 0.2 | 0.2 | 0.2 | 0.2 |
| Citric acid | | 0.05 | 0.15 | 0.25 |
| pH | 5.55 | 4.96 | 4.90 | 4.86 |
| Boiling Test | ++ | + | − | − |

TEST 4

| Ingredients | (I) | (II) | (III) | (IV) | (V) |
|---|---|---|---|---|---|
| Milk | 35 | 35 | 35 | 35 | 35 |
| | | (g) | | | |
| Apple | 60 | 60 | 60 | 60 | 60 |
| Sugar | 4.8 | 4.8 | 4.8 | 4.8 | 4.8 |
| CMC | 0.2 | 0.15 | 0.1 | 0.075 | 0.05 |
| pH | 4.82 | 4.84 | 4.85 | 4.86 | 4.85 |
| Boiling Test | − | − | − | + | ++ |

In Test 1, with respect to the milk-orange juice beverage as disclosed in the Shenkenberg et al. patent, a stable milk drink cannot be obtained when the ratio of milk and orange juice becomes about 3:1 or less. On the other hand, Test 2 shows that no stable beverage can be obtained when apple juice instead of orange juice is used as the basis of the same composition as specified in claim 6 of the Shenkenberg et al. patent. However, as shown in Test 2 (IV), if the ratio of milk and apple juice is 3:6.5, a stable product is obtained.

Test 3 shows that it is essential to add an aliphatic hydroxycarboxylic acid such as citric acid in accordance with this invention to obtain a stable mixture of the same ratio of the compositions as the Shenkenberg et al. patent if apple juice is used instead or orange juice. To achieve stability in an apple juice-milk drink having a pH lower than 5.0, as taught by this invention, the amount of CMC must be significantly higher than the ratio of approximately 1 part of CMC to 250-2500 parts of milk, as suggested by Shenkenberg et al, (Col. 3, ll. 3-8).

Test 4 (V) shows that an apple juice-milk drink having a pH of 4.5 is unstable even with 1 part of CMC to 700 parts of milk.

The described tests show most cogently that a stable milk-apple juice drink may be prepared in accordance with this invention by the utilization of specified components in relatively narrow quantitative ranges.

Experiments were conducted with fruit juice - milk drinks in accordance with the disclosure in U.S. Pat. No. 2,818,342 of Ransom and with the apple juice - milk drink of the present invention to ascertain the comparative stability of such fruit juice - milk drinks.

In the experiments, orange-milk drink was first prepared in accordance with the disclosure of the Ransom patent. A natural orange concentrate was prepared, having a sugar concentration of 10.4° Brix and a pH of 4.17 before the addition of sugar, and a sugar concentration of 30.8° Brix and a pH of 4.12 after addition of sugar. A specified amount of fresh milk (pH 6.77) and a predetermined amount of the sugar-added natural orange concentrate were mixed, shaken and placed in two test tubes. In order to observe changes in appearance over a period of time, one test tube containing the mixture was subjected to the boiling test and the second was allowed to stand at a cold temperature of about 5° C. The test results of appearance resulting from the boiling test are given in the following table:

TEST 5

| Ratio* | pH | 5 mins. | 6 hrs. | 16 hrs. | Boiling Test** |
|---|---|---|---|---|---|
| 1:4 | 6.09 | − | Separation of supernatant | Separation of supernatant | + |
| 1:3 | 6.02 | − | " | " | ++ |
| 1:2 | 5.69 | − | " | " | +++ |

TEST 5-continued

| Ratio* | pH | 5 mins. | 6 hrs. | 16 hrs. | Boiling Test** |
|---|---|---|---|---|---|
| 1:1 | 5.22 | — | Coagulation | Coagulation | +++ |

*The ratio of sugar-added natural orange concentrate to milk.
**The test tube was immersed in boiling water and checked for coagulation 5 minutes after the temperature of the contents reached about 95° C. The symbol "+" indicates the degree of coagulation.

The Ransom patent, column 3, lines 3 to 21 discloses the results of analysis of concentrate containing sugar added thereto, in which the concentrate is indicated as having a pH of 3.7.

Accordingly, the sugar-added natural orange concentrate prepared as described was adjusted to a pH of 3.7 with 50% aqueous citric acid solution, and the adjusted concentrate was then tested. The results are given in the following table:

TEST 6

| Ratio* | pH | 5 mins. | 6 hrs. | 16 hrs. | Boiling Test** |
|---|---|---|---|---|---|
| 1:4 | 5.70 | — | Separation of supernatant | Separation of supernatant | ++ |
| 1:3 | 5.58 | — | " | " | +++ |
| 1:2 | 5.18 | — | " | " | +++ |
| 1:1 | 4.58 | Immediate Coagulation | Coagulation | Coagulation | |

*The ratio of sugar-added natural orange concentrate (pH 3.7) to milk.
**The test tube was immersed in boiling water and checked for coagulation 5 minutes after the temperature of the contents reached about 95° C. The symbol "+" indicates the degree of coagulation.

Using the same techniques, but employing apples instead of oranges, an apple juice - milk drink was prepared by the procedure of the Ransom patent. A natural apple concentrate was prepared having a sugar concentration of 12.2° Brix and a pH of 3.65 before the addition of sugar and a sugar concentration of 32.4° Brix and a pH of 3.62 after the addition of sugar. Fresh milk (pH 6.77) was mixed with the sugar-added apple concentrate and the mixture was tested as described above in the testing of the orange juice - milk drink. The following results were obtained:

TEST 7

| Ratio* | pH | 5 mins. | 6 hrs. | 16 hrs. | Boiling Test** |
|---|---|---|---|---|---|
| 1:4 | 5.83 | — | Separation of supernatant | Separation of supernatant | ++ |
| 1:3 | 5.70 | — | " | " | +++ |
| 1:2 | 5.40 | — | " | " | +++ |
| 1:1 | 4.70 | Immediate | Coagulation | Coagulation | |

TEST 7-continued

| Ratio* | pH | 5 mins. | 6 hrs. | 16 hrs. | Boiling Test** |
|---|---|---|---|---|---|
| | | Coagulation | | | |

*The ratio of sugar-added natural apple concentrate to milk.
**The symbol "+" indicates the degree of coagulation 5 minutes after the temperature reached about 95° C.

The testing of the orange juice - milk drink showed that the orange juice - milk drink of Ransom undergoes separation and becomes inedible when maintained under refrigeration of about 5° C, thus requiring freeze-drying for preservation immediately after preparation. When apple juice is used instead of orange juice for a milk drink prepared in accordance with the procedure of the Ransom patent, the same lack of stability and necessity for freeze-drying for preservation immediately after preparation was found. It was also found that the orange juice - milk drink of Ransom was not amenable to heat-sterilization and so not preservable for a prolonged time due to the presence of bacteria.

The apple juice composition prepared in accordance with the present invention was heated at 80° C for one hour, packed in 5-gallon cans, sealed and cooled. Use in milk drinks after being preserved for 1 year at 38° C showed no substantial differences in flavor, taste and/or stability when both the stored and freshly made apple compositions were tested in milk drinks.

Testing also showed that the apple juice - milk drink of the present invention, when placed in glass tubes, sealed and then sterilized at 80° for 30 minutes was found to be free of any appreciable changes in flavor, taste and stability after storage for one month at room temperature.

By the present invention, new and novel apple juice compositions and apple juice - milk drink are obtained which are stable, amenable to sterilization by heat, and capable of preservation for a month at room temperature and/or for a year at cool temperature, without loss of flavor or edibility.

What is claimed is:

1. A milk-apple juice drink having a pH of 3.6–4.5 and comprising milk, an aqueous solution of sweetener wherein the sweetener is used in sweetening amounts and apple juice composition, the volume ratio of said milk, aqueous solution of sweetener and apple juice composition being 3.0 – 5.0:6.5 – 4.5: 0.5, said apple juice composition comprising per 100 ml of composition 4.2 – 6.0 grams of sodium carboxymethyl cellulose, 10 – 50 grams of apple juice and 3.1 – 5 grams of aliphatic hydroxycarboxylic acid selected from the class consisting of citric acid, lactic acid, malic acid and tartaric acid.

2. A milk-apple juice drink in accordance with claim 1 in which the hydroxycarboxylic acid is citric acid.

3. A milk-apple juice drink in accordance with claim 1 in which the milk is fresh milk.

* * * * *